J. ROBBINS.
Joint for Water and Other Pipes.

No. 221,864. Patented Nov. 18, 1879.

WITNESSES.
INVENTOR.

UNITED STATES PATENT OFFICE.

JAMES ROBBINS, OF LONDON, GREAT BRITAIN.

IMPROVEMENT IN JOINTS FOR WATER AND OTHER PIPES.

Specification forming part of Letters Patent No. 221,864, dated November 18, 1879; application filed September 10, 1879; patented in England, August 22, 1877, and in France, December 24, 1877.

*To all whom it may concern:*

Be it known that I, JAMES ROBBINS, of the city of London, in the Kingdom of Great Britain, have invented an Improved Joint for Water and other Pipes, of which the following is a specification.

My invention consists in an improved method of making the joint between two lengths of pipe, which may be either of earthenware, iron, lead, or any other suitable material, and to be employed for the conducting of sewage, gas, water, or other liquids or fluids.

Near one end of the pipe, and round the outside, a cupped or recessed collar is formed, and the extreme end or neck is a continuation of the body of the pipe. At the other end of the pipe is formed a socket.

The joint is made by forcing the projecting end or neck of one length of pipe into the socket of the following length until it abuts tight against a shoulder formed inside the socket. At the same time the end of the socket will be forced into the cupped or recessed collar, thus forming a firm and tight joint.

The substance used for filling in the joint will vary according to the material of which the pipes are made, and should be placed or poured into the cupped or recessed collar.

Figure 1:
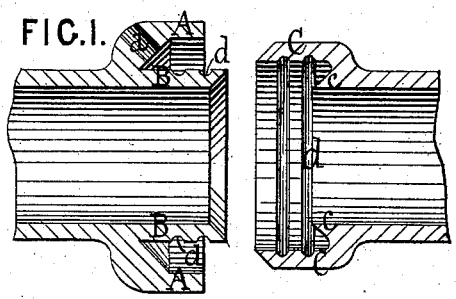
Figure 2:
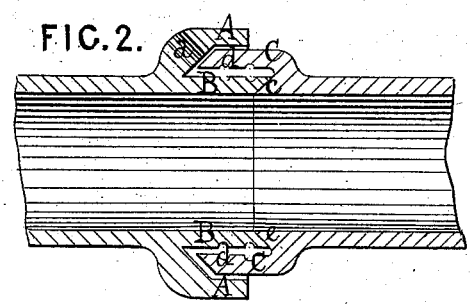
Figure 3:
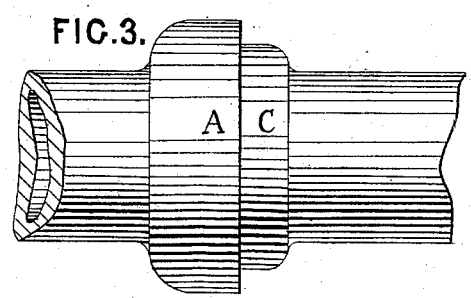

In the accompanying drawings, Figure 1 shows a longitudinal section of the two opposite ends of two round pipes apart. Fig. 2 shows a longitudinal section of them jointed together. Fig. 3 shows an elevation of the same.

A is the cupped or recessed collar formed round one end of the pipe. B is the neck or continuation of the body of the pipe, and C is the socket formed at the opposite end of the adjoining length of pipe.

To form the joint, the neck B is forced into the socket C until it abuts against the shoulder C. At the same time the socket C enters loosely into the recessed collar A.

Figure 6:
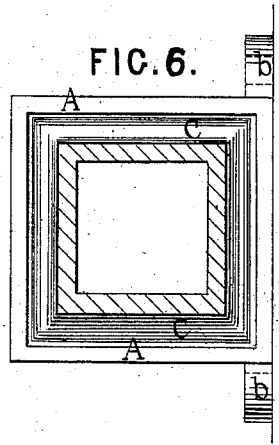
Figure 5:
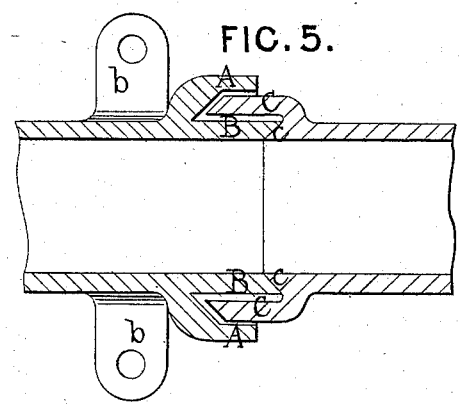

Figs. 5 and 6 show the same form of joint applied to a square pipe, *b b*, showing the lugs for fixing it when required.

Figure 4:
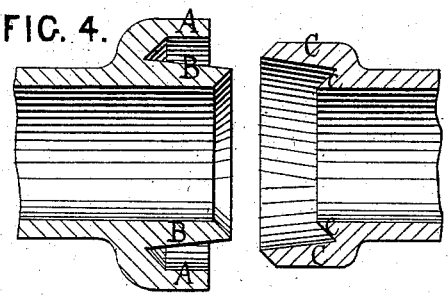
Figure 8:
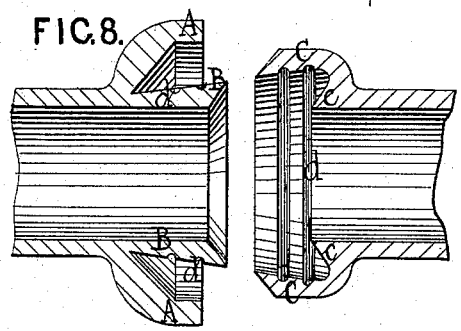

When it may be necessary to make a joint in which the pipes may be taken apart, the neck and the socket may be tapered to facilitate their withdrawal, as shown in Fig. 4. For making a permanent joint, these parts may be tapered in the opposite direction, so as to form a dovetail with the substance used for filling in, as show in Fig. 8; and also the exterior part of the neck and the interior of the socket may have ribs or grooves running round them, so as to give a firmer gripe to the filling-in material, as shown at *d* in Figs. 1, 2, 7, and 8.

In filling in the joint with any liquid material, such as asphalt or molten lead, a hole or opening may be made through any convenient part of the recessed or cupped collar A, or through the socket C, and through which hole the material may be poured. Such a hole is shown at *a* in Figs. 1 and 2.

When a substance such as Portland or other cement is used for filling in it is placed in the cupped or recessed collar before the joint is made.

Figure 7:
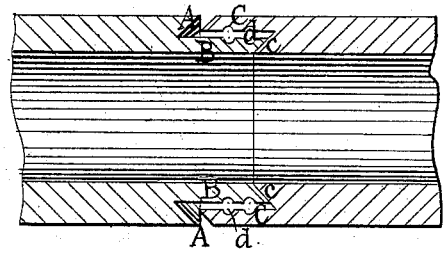

Fig. 7 shows a modification of this joint, in which the principle is the same, the cupped collar being replaced by a recess formed in the body of the pipe itself.

In the drawings the parts which abut against one another are shown beveled; but they may be made in any other suitable form.

The pipes may be made of any suitable material, size, or shape.

I claim as my invention—

1. The combination of the cupped or recessed collar A and the projecting end or neck B, formed at one end of the pipe, and the socket C, provided with the shoulder *c*, formed at the other end of the following length of pipe, the projecting end or neck B entering into the socket C and abutting against the shoulder *c*, and the socket C entering into the recessed or cupped collar A, as described.

2. The combination of the projecting end or neck B and the recessed collar A, formed in the body of the pipe at one end, and the socket C, provided with the shoulder *c*, formed at the other end of the following length of pipe, and the grooves *d d*, the projecting end or neck B entering the socket C and abutting against the shoulder *c*, and the socket C entering into the recess A formed in the body of the pipe, as described.

JAMES ROBBINS.

Witnesses:
HERBERT J. ALLISON,
CHARLES ARTHUR ALLISON.